United States Patent [19]
Kuwabara et al.
[11] Patent Number: 4,672,398
[45] Date of Patent: Jun. 9, 1987

[54] INK DROPLET EXPELLING APPARATUS

[75] Inventors: Tadashi Kuwabara, Yokohama; Yasumasa Matsuda; Masatoshi Kasahara, both of Hitachi; Kyoji Mukumoto; Kazuyoshi Tokunaga, both of Katsuta, all of Japan

[73] Assignees: Hitachi Ltd.; Hitachi Koki Co., Ltd., both of Tokyo, Japan

[21] Appl. No.: 793,241

[22] Filed: Oct. 31, 1985

[30] Foreign Application Priority Data

Oct. 31, 1984 [JP] Japan ................................ 59-227767

[51] Int. Cl.[4] ................................ G01D 15/16
[52] U.S. Cl. ................................ 346/140 R
[58] Field of Search ................................ 346/140

[56] References Cited

U.S. PATENT DOCUMENTS

| | | | |
|---|---|---|---|
| 4,068,144 | 1/1978 | Toye | 346/75 X |
| 4,112,433 | 9/1978 | Vernon | 346/140 X |
| 4,251,824 | 2/1981 | Hara | 346/140 |
| 4,296,421 | 10/1981 | Hara | 346/140 |
| 4,424,520 | 1/1984 | Matsuda | 346/140 |

*Primary Examiner*—Joseph W. Hartary
*Attorney, Agent, or Firm*—Antonelli, Terry & Wands

[57] ABSTRACT

Disclosed is an ink droplet expelling apparatus for expelling an ink droplet in response to an electric signal, compising a printing head provided with one or more ink chambers, electro-mechanical transducers disposed on the printing head corresponding to the ink chambers, and a driving signal generating circuit for producing electric signals for driving the electro-mechanical transducers. The elector-mechanical transducers are distorted by three different driving signals to reduce the volumes of the ink chambers to raise the pressure therein to thereby expel an ink droplet out of a nozzle formed at the front end of the head. The three driving signals are applied to the electro-mechanical transducers in a predetermined order, the first one giving the ink a velocity, the second one accelerating the ink to expel it in the form of an ink droplet out of the nozzle, the third one acting to suppress the pressure fluctuation in the ink chambers caused by the first and second driving signals as well as to supplement ink in the ink chambers from an ink tank.

12 Claims, 32 Drawing Figures

INK DROPLET EXPELLING APPARATUS

BACKGROUND OF THE INVENTION

1. Field of the Invention

The present invention generally relates to an ink droplet expelling apparatus which can be applied to a non-impact printing apparatus, and particularly relates to an improved ink droplet expelling apparatus in which printing can be performed at a high speed as well as stably when the ink droplet expelling apparatus is used in a drop on-demand ink jet recording apparatus.

2. Description of the Prior Art

Conventionally, an apparatus in which ink droplets are expelled in accordance with printing signals so as to perform desired printing on a recording medium, that is, a so-called drop on-demand ink jet expelling apparatus has been known and a basic arrangement thereof is disclosed, for example, in U.S. Pat. No. 3,946,398 filed by Kyser et al. Further, an ink droplet expelling head in which a backflow of ink into an ink nozzle is suppressed immediately after an ink droplet has been expelled is disclosed, for example, in Japanes patent application unexamined publication No. 52-109935 laid open Sept. 14, 1977, filed in Japanes Patent Office claiming convention priority right on the basis of West German Application No. P 2555738.7 filed Dec. 11, 1975.

Each of those apparatuses has a simple arrangement having a single ink chamber and a single electro mechanical transducer for applying a pressure to the single ink chamber, so that ink droplets are expelled in accordance with pulses applied to the single electro-mechanical transducer FIG. 1 shows a general example of the conventional ink droplet expelling head having such a simple arrangement as described above.

In the cross sectional view (a) of FIG. 1, an ink droplet expelling head 1 is arranged such that a glass plate 3 is stuck to a silicon plate 2 formed with a groove 2*a* so as to form an ink chamber 4 with its front end communicated with an expelling nozzle 5 and with its rear end communicated with an ink tank 9 through a 3oint 6 and a pipe 7, and that an electro-mechanical transducer 8 for bending the silicon plate 2 to decrease the volume of the ink chamber 4 is stuck to the outer surface of the silicon plate 2. As the electro-mechanical transducer 8, mainly used is a piezo-electric device which is adapted to be deformed to bend the silicon plate 2, as shown in the partial cross-sectional view (b) of FIG. 1, in response to a driving pulse voltage applied thereto from an electric circuit (not shown).

FIG. 2 shows a process of expelling of an ink droplet out of the expelling nozzle 5 when an electric signal (a driving pulse voltage) is applied to the piezo-electric device 8 as the time elapses through the views (a) to (e). The view (a) of FIG. 2 shows the state where no voltage is applied to the piezo-electric device 8. The view (b) of FIG. 2 shows the state where a voltage is applied to the piezo electric device 8 so as to cause the piezo-electric device 8 to begin to deform to increase the pressure in the ink chamber 4 so as to expel ink 10. The view (c) of FIG. 2 shows the step where the voltage applied to the piezo-electric device 8 is removed and the piezo-electric device 8 is restored to its original shape, so that the ink chamber 4 becomes to have a negative pressure so that almost all the part of the ink 10 separated from an expelled ink portion is sucked back into the ink chamber 4 and the expelled ink portion flies toward a recording medium (not shown) in the form of an ink droplet 10*a*. Thereafter ink is supplemented to the ink chamber 4 from the ink tank 9 through the pipe 7. At that time, as shown in the views (d) and (e) in FIG. 2, the ink droplet 10*a* gradually becomes substantially spherical due to a surface tension thereof, during its flying. Sometimes, there occurs such a phenomenon that very small size ink droplets (satellites) follow the ink droplet 10*a*, in the case where the voltage of the driving signal applied to the piezo-electric device 8 is made higher.

One of the conditions required for the performance of the ink droplet expelling head is that a single ink droplet having a predetermined size should be expelled in accordance with an electric signal at a high speed as much as possible. In order to increase the expelling speed of the ink droplet, in the conventional ink droplet expelling head 1 as shown in FIG. 1, there has been proposed only the method of increasing the voltage applied to the piezo-electric device 8 so as to increase the amount of deformation of the piezo-electric device 8, that is, the amount of deformation of the silicon plate 2. When the amount of deformation of the silicon plate 2 increases, however, a negative pressure in the ink chamber 4 increases when the silicon plate 2 is restored to its original shape after the applied voltage was removed, so that a backflow of ink into the ink chamber 4 in the state of the view (c) of FIG. 2 becomes large. Therefore, air bubbles may be mixed into the ink 10 through the expelling nozzle 5 to thereby deteriorate the stable ink expelling condition thereafter and at last it may becomes impossible to perform the ink expelling operation. Due to such a problem, there is a limitation in expelling speed of the ink droplet 10*a*, that is about 3–3.5 m/sec at highest.

A second one of the conditions required for the performance of the ink droplet expelling head is that in order to perform printing at a high speed as much as possible, the ink expelling time intervals between adjacent ink droplets should be shortened. That is, the frequency of the electric signal applied to the piezo-electric device 8 is made high as much as possible.

FIG. 3 shows a frequency versus voltage characteristic of the driving signal applied to the piezo-electric device 8 of the ink droplet expelling apparatus having the conventional arrangement as shown in FIG. 1. Here, a curve s designates the minimum driving voltage (a threshold value) for making it possible to expel ink out of the expelling nozzle 5, while a curve u designates the maximum driving voltage for normally expelling a single ink droplet. When the applied voltage is made higher than the maximum driving voltage, the amount of deformation of the piezo-electric device 8 becomes so large that there occurs such a disadvantage that air bubbles may enter the ink chamber, or alternatively a plurality of small ink droplets may be expelled. It is desirable for this characteristic that a distance between the curves s and u is large as much as possible and constant even in the case where a driving frequency f is made higher.

As seen from FIG. 3, in the conventional ink droplet expelling apparatus, there was a limitation in frequency for performing stable ink droplet expelling with a predetermined voltage and it was impossible to drive the conventional ink droplet expelling apparatus with frequencies above a predetermined frequency $f_0$, resulting in limitation in printing speed. The limitation in frequency is caused by the transitional pressure fluctuation within the ink chamber 4 immediately after the ink droplet expelling. The pressure fluctuation in the ink chamber 4 is caused by free vibrations of the silicon plate 2 which continue for a time even after the voltage applied to the piezo-electric device 8 has been removed and by an acoustic effect due to a pressure wave propagated through the ink chamber 4.

FIG. 4 shows examples of such a pressure fluctuation as described above. Now, when the piezo-electric device 8 is driven by a driving pulse I (an electric signal), the pressure fluctuation in the ink chamber follows an attenuation curve as shown by a solid line a. Then, if the piezo-electric device 8 is driven by a driving pulse II with a frequency $f_1$, the pressure fluctuation a due to a driving pulse I and the pressure fluctuation b due to the driving pulse II are composed of each other into the pressure fluctuation b', so that the pressure in the ink chamber becomes larger than a normal value (a or b). Further, if the frequency of the driving pulse is selected to be $f_2$, the pressure fluctuation a due to the driving pulse I and the pressure fluctuation c due to a driving pulse II' are composed of each other into the pressure fluctuation c', so that the pressure fluctuation in the ink chamber becomes smaller than the normal value. The unstable characteristic as shown in FIG. 3 is caused by such operations as described above.

Further, such a technique that an ink chamber is divided into two sections which are separately provided with individual piezo-electric devices to which electric signals individually applied to cause the piezo-electric devices to expel ink droplets, is disclosed in Japanese patent application Unexamined Publication No. 56-146765 filed in Japanese Patent Office Apr. 16, 1980 by the same assignee as the present application and laid-open Nov. 14, 1981. In this arrangement, the voltage of the individual electric signal is lowered and the negative pressure in the ink chamber after the voltage has been removed is decreased, so that a backflow of ink is suppressed, and at the same time, a synergistic effect due to the driving performed by the two electric signals increases the ink expelling speed. In this method, however, no measures for suppressing the pressure fluctuation in the ink chamber after the removal of the applied voltage is taken into consideration and there is a limitation in increase of driving frequency.

SUMMARY OF THE INVENTION

An object of the present invention is to solve the foregoing problems in the conventional ink droplet expelling apparatus having a simple arrangement.

Another object of the present invention is to provide an ink droplet expelling apparatus in which an ink droplet can be expelled at a high expelling speed, and the ink droplet can be stably expelled in accordance with a higher driving frequency.

In order to solve the foregoing problems in the prior art so that an ink droplet can be expelled at a high speed and driving can be made with a higher frequency, conditions are required for the ink droplet expelling apparatus in the following three points or operations:

(1) Acceleration of an ink flow to expel an ink droplet out of the nozzle at a sufficient speed;

(2) Reduction in pressure in the ink chamber at suitable timing for separating an ink droplet from the ink in the ink chamber; and (3) Suppression of pressure fluctuation in the ink chamber immediately after ink droplet expelling, and supplement of ink required for the next ink droplet.

In order to satisfy these conditions, in the ink droplet expelling apparatus according to the present invention, the three operations as described above are separately controlled in accordance with individual driving signals.

The above and other objects, features, and advantages of the present invention will be apparent from the following detailed description taken in conjunction with the accompanying drawings.

DESCRIPTION OF THE PREFERRED EMBODIMENTS

Figure 1:
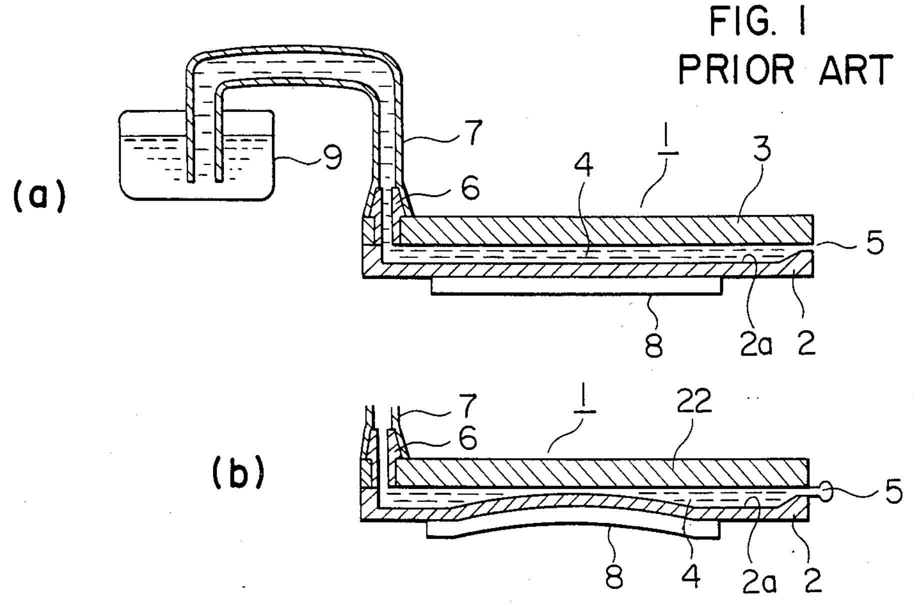
FIG. 1 PRIOR ART
FIG. 1 shows in longitudinal cross-section an example of the conventional ink droplet expelling head having a simple arrangement, in which the views (a) and (b) illustrate the respective states where no voltage signal and a voltage signal is applied to the head, respectively.
Figure 2:
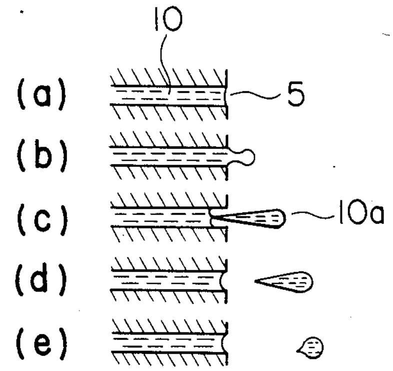
FIG. 2 shows the steps (a)–(e) of expelling an ink droplet out of the conventional ink droplet expelling head.
Figure 5A:
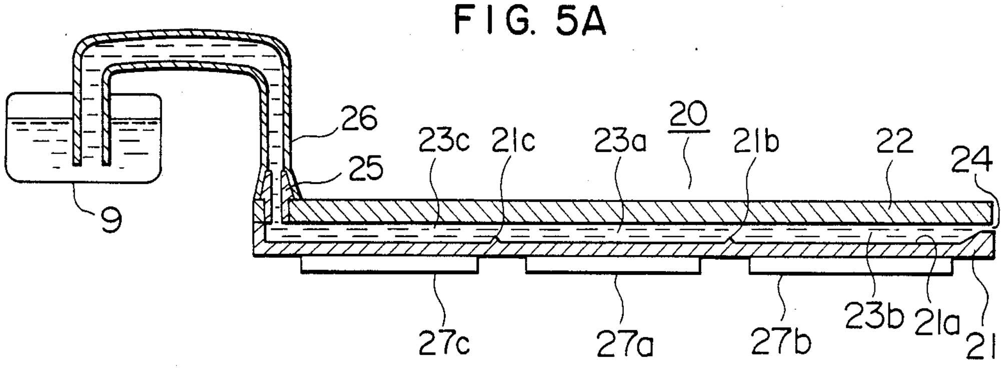
FIGS. 5A and 5B are sectional side and plan views each showing an embodiment of the ink droplet expelling head of the ink droplet expelling apparatus according to the present invention.
Figure 5B:
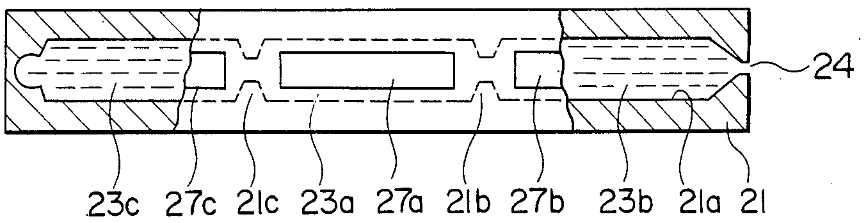
Figure 6:
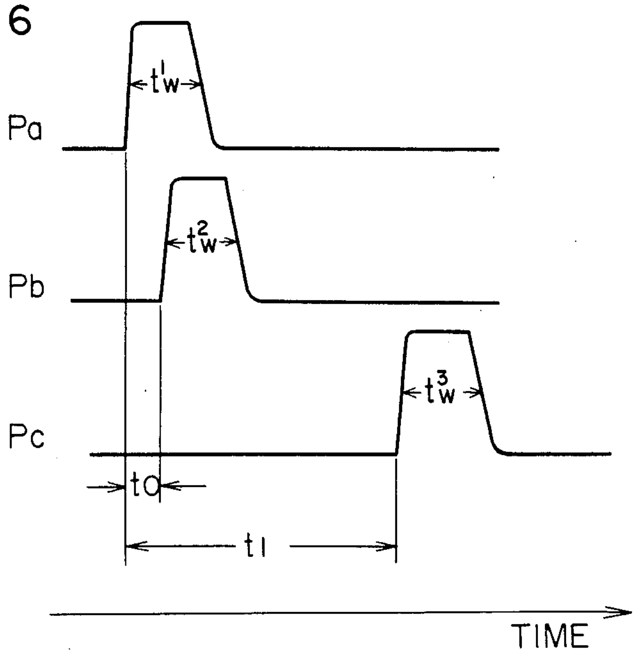
FIG. 6 shows waveforms of driving voltages for driving the ink droplet expelling apparatus according to the present invention.

FIGS. 5A and 5B show an embodiment of an ink droplet expelling head of the ink droplet expelling apparatus according to the present invention, and FIG. 6 shows waveforms of driving signals for driving the ink droplet expelling head. The ink droplet expelling head 10 is arranged in the following manner. A glass plate 22 is stuck, for example by anodic bonding, onto the upper surface of a silicon plate 21 in which a groove 21*a* is formed by alkali-etching, the groove 21*a* being sectioned into three regions by two orifices 21*b* and 21*c* so as to form three ink chambers 23*a,* 23*b,* and 23*c* which are serially extended to the front end of a nozzle 24 and communicated with one another through the orifices 21*b* and 21*c.* The front end of the ink chamber 23*b* is communicated with the nozzle 24 and the rear end of the ink chamber 23*c* is communicated with an ink supply pipe 26 through a joint 25, the ink supply pipe 26 being connected to an ink tank 9 in the same manner as in FIG. 1A. Electro-mechanical transducer elements 27*a,* 27*b* and 27*c* are stuck onto the lower surface of the silicon plate 21 at portions corresponding to the ink chambers 23*a,* 23*b,* and 23*c* for distorting the silicon plate at those portions 21 so as to individually decrease in volume of the respective ink chambers 23*a,* 23*b,* and 23*c.* As the electro-mechanical transducer elements 27*a* to 27*c,* piezo electric device (hereinafter referred to as PZTs) may be used, and respective driving pulse signals $P_a$, $P_b$, $P_c$ as shown in FIG. 6 are applied to the PZTs 27*a,* 27*b,* and 27*c* so that each of the PZTs serve for expelling one ink droplet.

The expelling operation of the ink droplet expelling head 20 will be described with reference to FIG. 7. First, the driving pulse signal $P_a$ is applied to the central PZT 27*a* to thereby generate a first pressure so as to cause an ink flow in the ink chambers 23*a* and 23*b* (FIG. 7(*a*)). When a sufficient flow is generated in the ink, the driving pulse signal $P_b$ is applied to the PZT 27*b* disposed closest to the nozzle 24 to thereby generate a sufficient pressure for expelling the ink in the ink chamber 23*b* of the nozzle 24 (FIG. 7(*b*)).

The reason why the individual driving signals $P_a$ and $P_b$ are respectively applied to the different $PZT_s$ 27*a* and 27*b* is to satisfy the first one of the three conditions described above in the item of "SUMMARY OF THE INVENTION". That is, a pressure is first applied to the ink by the central PZT 27*a* so as to give the ink a velocity in a predetermined direction. The ink is then accelerated by the PZT 27*b* disposed closer to the nozzle 24 than the PZT 27*a* so that the ink expelled out of the nozzle 24 can have a higher velocity. Moreover, even if small particle ink droplets (satelites) would fly following the expelled ink droplet, the sufficient speed in the predetermined direction is given to the ink so that the large ink droplet as well as the small ink droplets have the same flying direction and no deterioration occurs in quality of printing.

Figure 3:
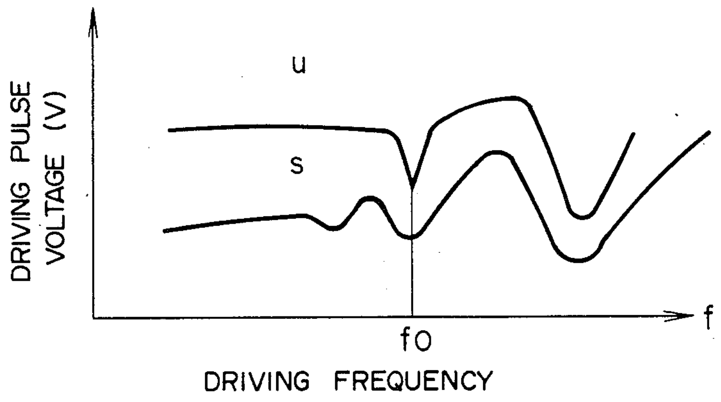
FIG. 3 PRIOR ART
FIG. 3 is a diagram showing the frequency versus driving voltage characteristic in the conventional ink droplet expelling apparatus.
Figure 4:
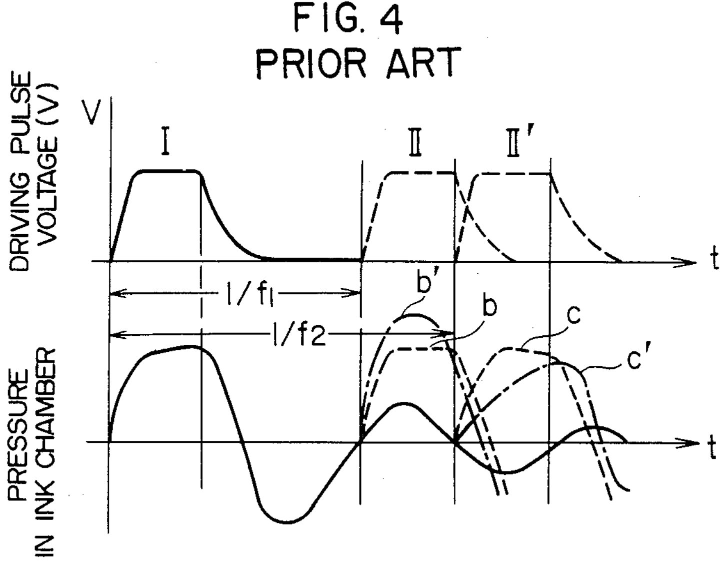
FIG. 4 PRIOR ART
FIG. 4 is a diagram for explaining the pressure fluctuation in the ink chamber with respect to a driving voltage.

In the conventional apparatus in which a single ink chamber expels ink in accordance with a single driving signal, the flying direction is different between a large ink droplet and the satelites which follow the former because the orientation of the ink droplets is insufficient in accelerating the ink. Therefore, in order to prevent deterioration in quality of printing, it is impossible to make high the driving voltage and there occurs such a phenomenon that the magnitude of the maximum driving voltage is lowered at a certain frequency $f_0$ as shown in FIG. 3.

Further, in this embodiment, since the driving signal is applied to the PZTs twice for ink expelling once, it is possible to make lower the voltage applied to the PZTs in comparison with the case where the driving signal is applied once every time a single ink droplet is expelled. Accordingly, the negative pressure generated in the ink chamber after the voltage has been removed can be made smaller.

Figure 7:
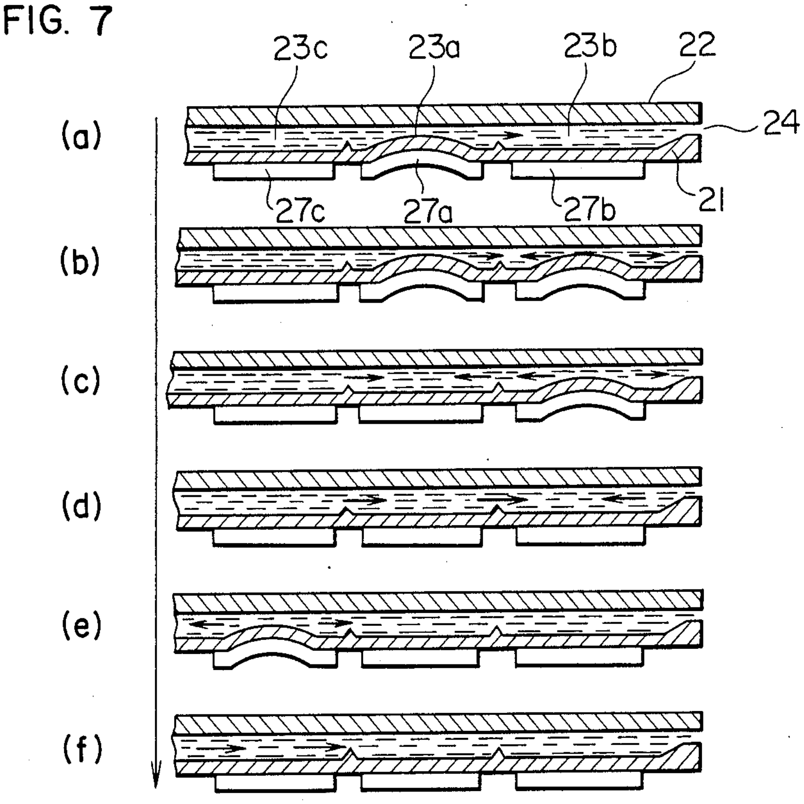
FIG. 7 shows steps (a)–(f) of expelling an ink droplet out of droplet expelling head in the embodiment of FIG. 5

When the driving signals applied to the PZTs 27*a* and 27*b* disappear successively, the PZTs 27*a* and 27*b* are successively restored to their original shapes ((c) and (d) in FIG. 7).

A negative pressure effect in the nozzle 24 is generated mainly when the driving signal applied to the PZT 27*b* is removed. If the respective timings of disappearing of the driving signals applied to the PZTs 27*a* and 27*b* are made different from each other, the amount of ink sucked back to the nozzle 24 can be suppressed to a smaller value so that the expelling speed of ink can be increased while suppressing the backflow of ink toward the ink chamber 23*b* in the vicinity of the nozzle 24. Thus, the second one of the foregoing three conditions is satisfied.

In the state as shown in (d) of FIG. 7, the ink pressure fluctuation in the ink chambers 23*a* and 23*b* is large, and particularly the ink pressure fluctuation in the ink chamber 23*b* affects the next ink droplet expelling. In order to suppress this ink pressure fluctuation, as shown in the views (e) and (f) of FIG. 7, the driving signal $P_c$ is applied to the PZT 27*c* to thereby generate a pressure in the ink chamber 23*c* disposed farthest from the nozzle 24. Thus, the third one of the foregoing three conditions is satisfied.

Figure 8:
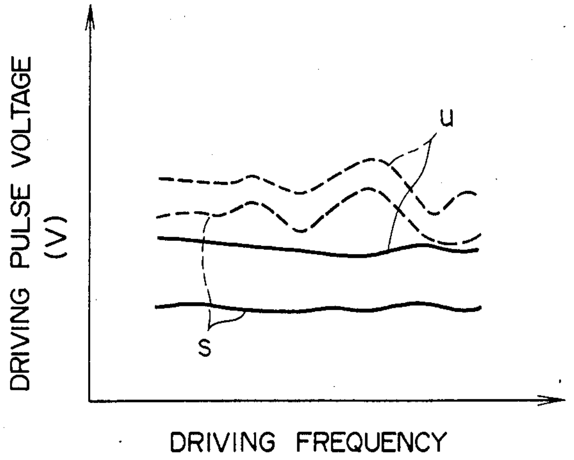
FIG. 8 is a d showing the voltage versus frequency characteristic in comparison between the ink droplet expelling apparatus according to the present invention and the conventional one.

In the thus arranged ink droplet expelling apparatus, it is made possible to control the pressure fluctations in the ink chambers 23*a* to 23*c* by the pressures generated in accordance with the respective driving signals applied thereto so that it is possible to electrically find out a condition required for improved ink droplet expelling regardless of the shape and/or quality of material of the ink chamber. FIG. 8 shows the voltage versus frequency characteristic of the driving signal in comparison between the ink droplet expelling apparatus according to the present invention and the conventional one having a simple arrangement, solid and dotted lines in the drawing showing the respective cases of the present invention and the conventional one respectively. As seen from FIG. 8, according to the present invention, the driving voltage can be lowered in its magnitude in comparison with the conventional one and it is possible to expel an ink droplet by a substantially constant driving voltage with respect to various frequencies. Moreover, the distance between the maximum and minimum driving voltages u and s, that is, the range of driving voltage value for obtaining good quality in printing, is widened in comparison with the conventional case.

Pulse timing of three driving signals $P_a$, $P_b$ and $P_c$ shown FIG. 6 depend on shapes and dimensions of the ink chamber and PZT. In the results of our experimentation, the best ink expelling characteristic can be obtained with such condition that $t_0$ is set in a range of 10 $\mu$sec~60 $\mu$sec, $t_1$ is set in a range of 100 $\mu$sec~250 $\mu$sec and pulse width $t^1w$, $t^2w$ and $t^3w$ are set in a range of 20 $\mu$sec~60 $\mu$sec.

Figure 9:
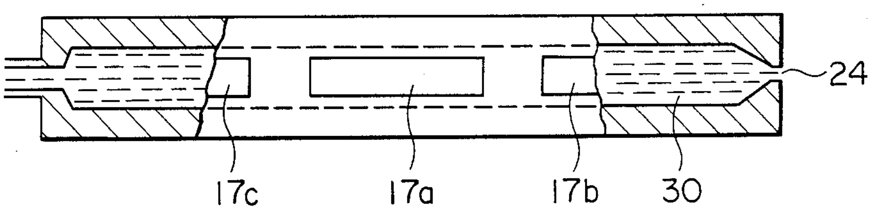
FIG. 9 is a sectonal plan view showing a second embodiment of the ink droplet expelling apparatus according to the present invention.

FIG. 9 shows a second embodiment of the ink droplet expelling head according to the present invention, in which it is possible to obtain substantially the same performance of ink droplet expelling as in the first embodiment. In this embodiment, there is provided no orifice for sectioning the ink chamber, but a single large ink chamber 30 is driven by three PZTs 17*a* to 17*c* the same with those in the first embodiment. In this case, although the rising of pressure in the ink chamber caused by the same magnitude of driving voltage is small in comparison with the first embodiment, there is no significant problem in practice use. In this embodiment, the driving signals and the generating timing thereof are the same as those shown in FIG. 6.

Figure 10:
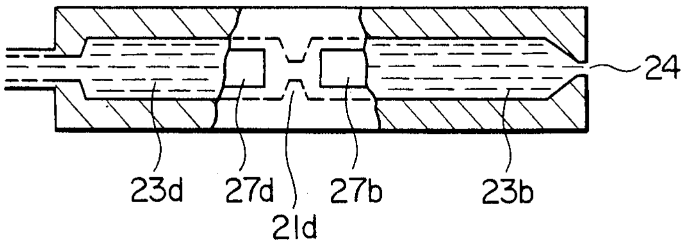
FIG. 10 is a sectional plan view showing a third embodiment of the ink droplet expelling apparatus according to the present invention.
Figure 11:
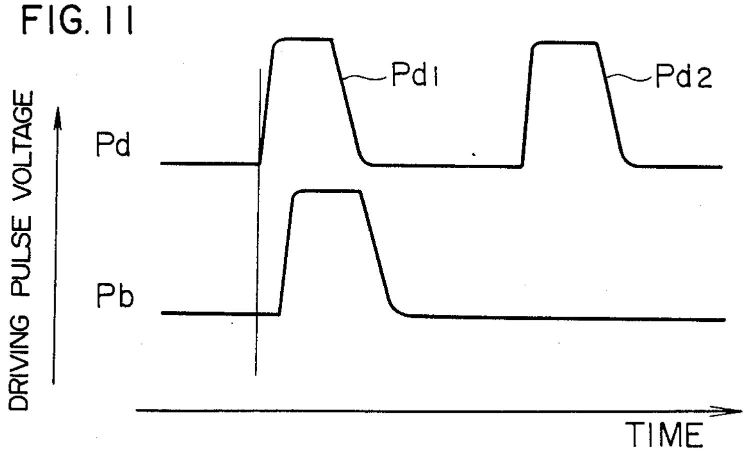
FIG. 11 shows waveforms of driving voltages which are applied to the third embodiment of FIG. 19.

FIG. 10 shows a third embodiment of the ink droplet expelling head according to the present invention. In FIG. 10, the ink chamber is sectioned by an orifice 21*d* into two ink chambers 23*b* and 23*d* which are driven by PZTs 27*b* and 27*d* respectively. FIG. 11 shows the timing of driving signals $P_b$ and $P_d$ respectively applied to the PZTs 27*b* and 27*d*. In this embodiment, the PZT 27*d* serves to perform the functions of the two PZTs 27*a* and 27*c* in the first embodiment as well as the PZTs 17*a* and 17*c* in the second embodiment. As shown in FIG. 11, a driving signal $P_{d1}$ is applied to the PZT 27*d* disposed farther from a nozzle 24 so as to make the pressure high in the ink chamber 23*d* so as to give the ink a velocity. Then, a driving signal $P_b$ is applied to the PZT 27*b* disposed closely to the nozzle 24 with a predetermined time delay from the application of the driving signal $P_{d1}$ so as to accelerate the ink to thereby expel an ink droplet through the nozzle 24. Thereafter, a driving signal $P_{d2}$ is applied to the PZT 27*d* again with a predetermined time delay from the application of the driving signal $P_b$, so as not only to suppress the pressure fluctuation in the ink chamber but also to supplement ink into the ink chamber from an ink tank. Basically, these operations are the same as in the first and second embodiments, and the driving signals $P_{d1}$, $P_{d2}$, and $P_b$ correspond to the driving signal $P_a$, $P_c$, and $P_b$ as shown in FIG. 6, respectively.

Figure 12:
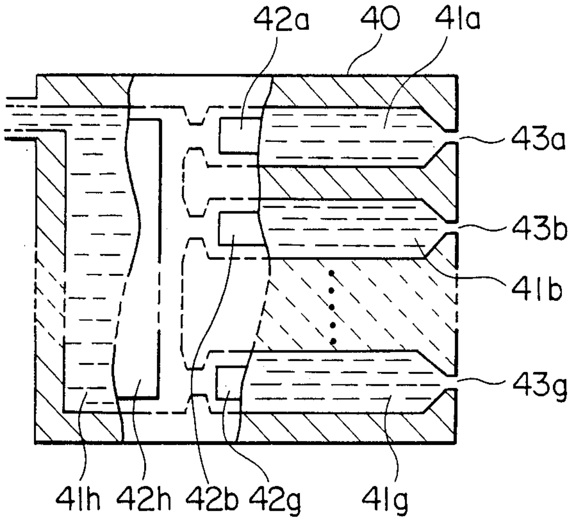
FIG. 12 is a sectional plan view showing a fourth embodiment of the ink droplet expelling head according to the present invention.

In the case where the ink droplet expelling head according to the present invention is applied to a multinozzle ink droplet expelling apparatus, it will do to provide a plurality of individual heads which are driven separately from each other. However, if these heads are integrated with each other into one head unit, the arrangement can be simplified. FIG. 12 shows an embodiment obtained by modifying the heads of the third embodiment so as to make it adapted to a multi-nozzle ink droplet expelling head 40.

In this embodiment, the ink chamber 23*d* and the PZT 27*d* of FIG. 10 correspond to a common ink chamber 41*h* and a common PZT 42*h* respectively. The operation for expelling an ink droplet is the same as that of the third embodiment of FIG. 10 basically. The driving signals $p_{d1}$ and $P_{d2}$ as shown in FIG. 11 are applied to the common PZT 42*h* while the driving signal $P_b$ as shown in FIG. 11 is applied to one of PZTs 42*a*–42*g* associated with a selected one of a plurality of nozzles 43*a*–43*g* to which an instruction of ink droplet expelling is given, the PZTs 42*a*–42*g* being attached to ink chambers 41*a*–42*g* respectively.

Figure 13:
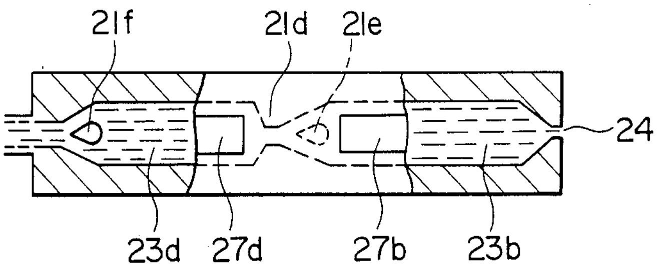
FIG. 13 is a sectional plan view showing a fifth embodiment of the ink droplet apparatus according to the present invention.

Further, in the embodiment of FIG. 10, it possible to easily remove air bubbles which are generated in the ink chambers 23*b* and 23*d* by providing lands 21*e* and 21*f* as shown in FIG. 13. This is becaues air bubbles are apt to stay at a portion where the ink chamber is suddenly expanded to make it difficult to remove the air bubbles in some cases, however, the provision of the lands 21*e* and 21*f* causes the air bubbles when they are generated.

Description will be made as to embodiments of a driving signal generating circuit for driving the ink droplet expelling heads in the foregoing embodiments.

Figure 14A:
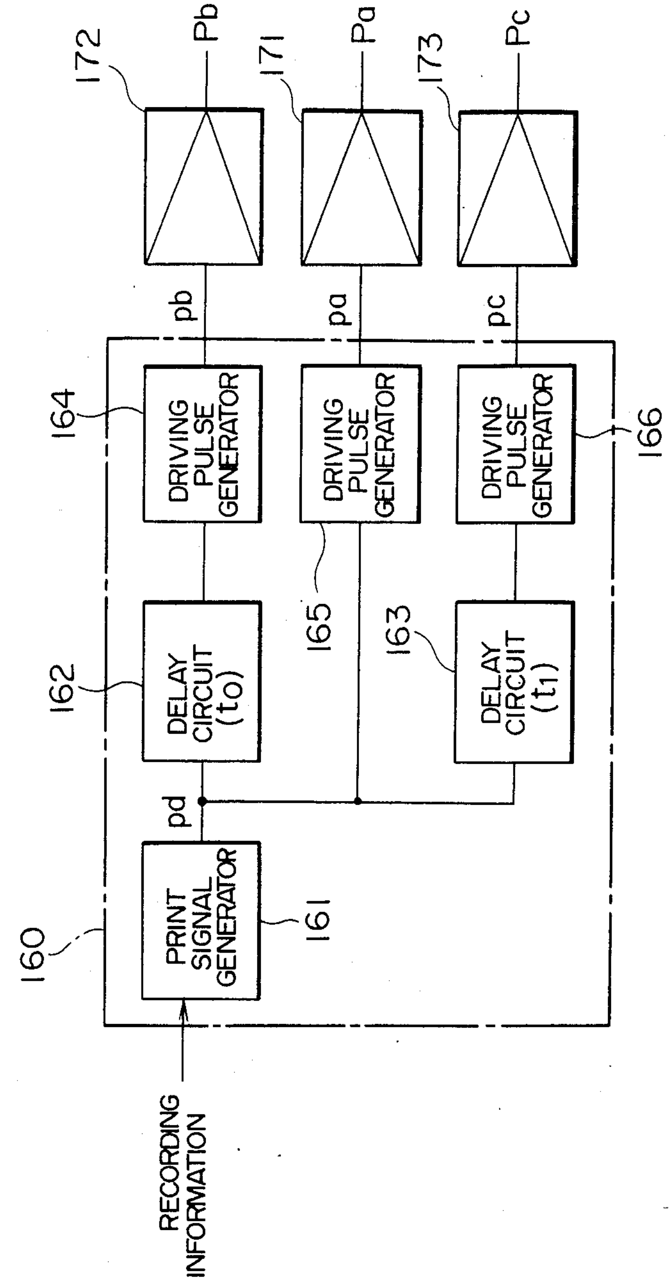
FIG. 14A is a black diagram showing an embodiment of the driving voltage generating circuit which can be applied to the first or second embodiment according to the present invention.
Figure 14B:
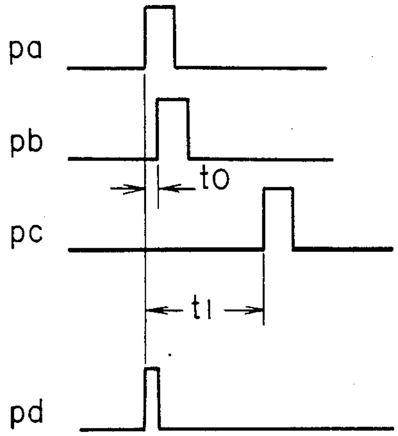
FIG. 14B shows a time chart of signals in the circuit of FIG. 14A.

FIG. 14A shows an embodiment of a circuit for generating the driving pulse signals as shown in FIG. 6. In FIG. 14A, a driving signal generating circuit 160 is provided with a printing signal generating circuit 161 for generating one pulse $P_d$ to expel an ink droplet in accordance with recording information, delay circuits 162 and 163, and pulse generating circuits 164, 165, and 166. The delay circuits 162 and 163 have delay constants $t_0$ and $t_2$ respectively. The respective pulse generating circuits 164, 165 and 166 generate pulses $P_a$, $P_b$ and $P_c$ each having a predetermined pulse width as shown in FIG. 14B. Amplifier circuits 171, 172, and 173 receive the pulses $P_a$, $P_b$ and $P_c$ and produce the driving pulse signals $P_a$, $P_b$ and $P_c$ as shown in FIG. 6, respectively.

Figure 15:
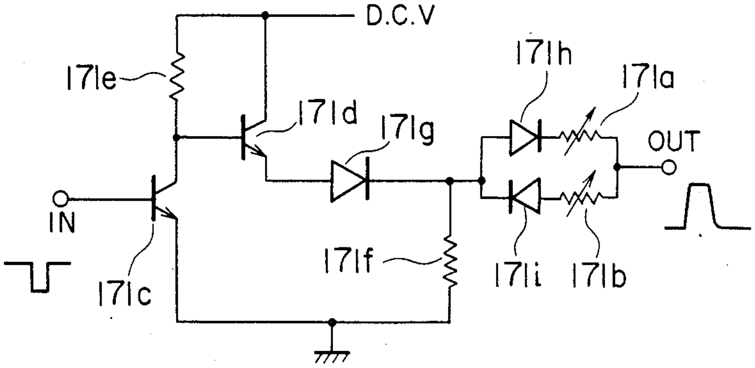
FIG. 15 is a circuit diagram showing another embodiment of the amplifier circuit in the driving voltage generating circuit of FIG. 14A.

It is possible to perform pressure control in the ink chamber not only by adjusting the delay time $t_0$ and $t_1$, and the each pulse width but also by adjusting the rising and falling timing of each driving pulse signal. If, for example, the amplifier circuit 171 (172, 173) of FIG. 14A is arranged as shown in FIG. 15, it is possible to vary the rising and falling timings by means of variable resistors 171*a* and 171*b* independently from each other. In FIG. 15, the amplifier circuit 171 is constituted by transistors 171*c* and 171*d*, resistors 171*e* and 171*f*, diodes 171*g*, 171*h*, and 171*i*, and the variable resistors 171*a* and 171*b*.

Figure 16:
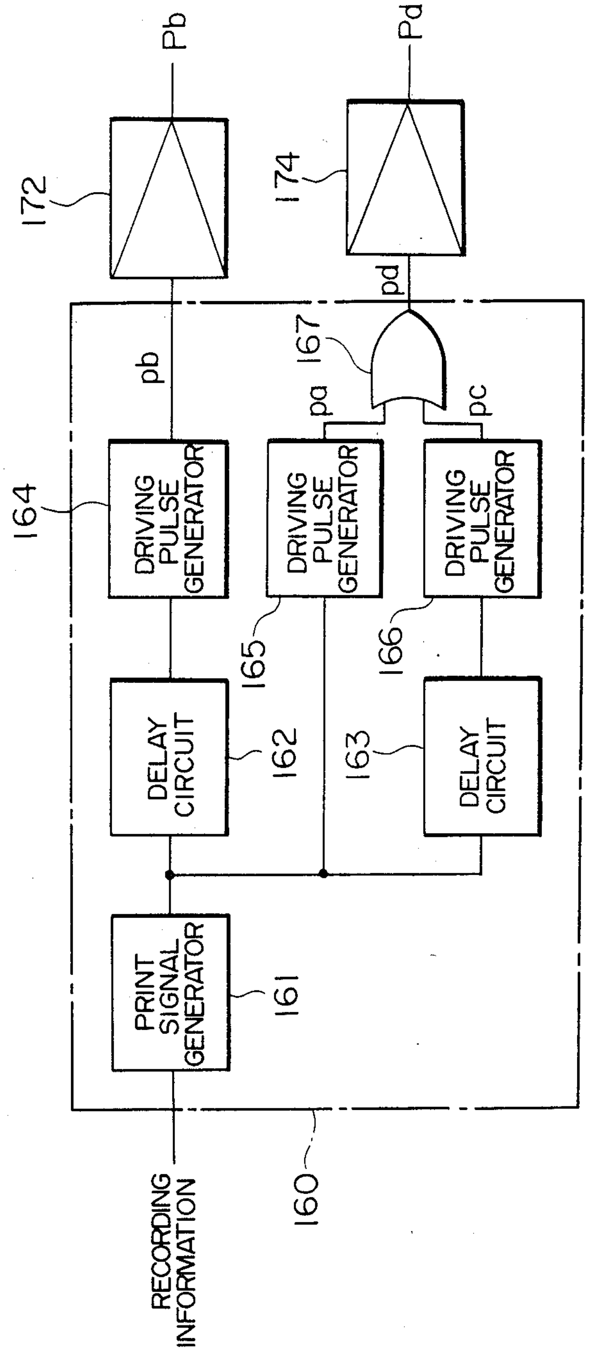
FIG. 16 is a block diagram showing an embodiment of the driving voltage generating circuit which can be applied to the third embodiment of the ink droplet expelling head according to the present invention.

The driving pulse signals $P_d$ and $P_b$ (as shown in FIG. 11) to be applied to the ink droplet expelling head of FIG. 10 may be obtained in such a manner as shown in FIG. 16. That is, the output pulses $P_a$ and $P_c$ respectively generated from driving pulse generating circuits 165 and 166 are applied to an amplifier circuit 174 through an OR gate 167 so a to obtain the driving pulse signal $P_d$ ($P_{d1}$ and $P_{d2}$), and on the other hand, the output pulse $P_b$ from a driving pulse generating circuit 164 is applied to an amplifier circuit 172 so as to obtain the driving pulse signal $P_b$.

Figure 17:
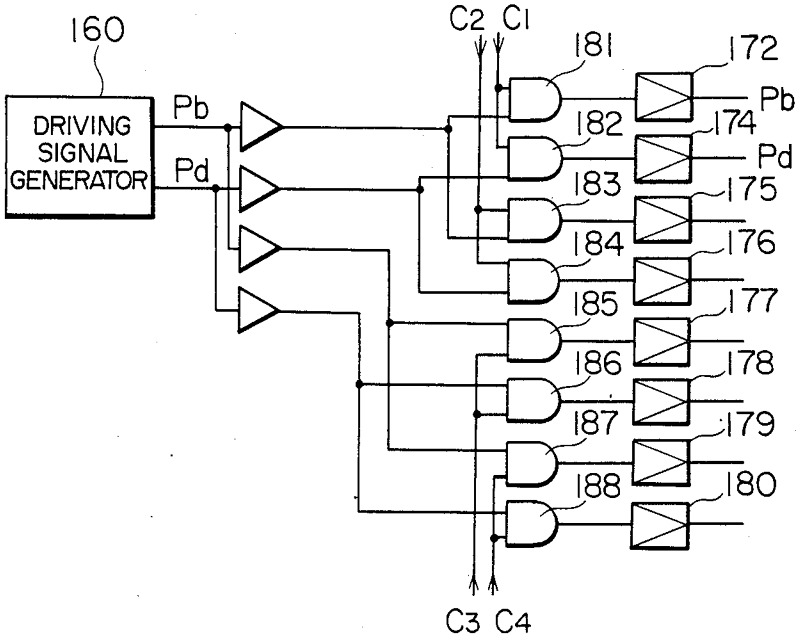
FIG. 17 is a block diagram showing a first embodiment of the driving voltage generating circuit which can be applied to the fourth embodiment of the ink droplet expelling head according to the present invention.

In the case of the multi nozzle ink droplet expelling head, it will do to prepare the circuits of FIG. 16 the same in number with the nozzles. Alternatively, however, it is advantageously possible to arrange the circuit as shown in FIG. 17 by using only one driving signal generating circuit of 160. In FIG. 17, printing signals C1, C2, C3 and C4 for the respective nozzles are applied to the respective one input termials of AND gates 181 and 182; AND gates 183 and 184 and gates 185 and 186; and AND gates 187 and 188, respectively, while the driving pulses $P_b$ and $P_d$ generated in the driving signal generating circuit 160 are applied to the respective other input terminals of the AND gates 181, 183, 185 and 187; and the AND gates 182, 184, 186 and 188, respectively; so that the driving pulses $P_b$ and $P_d$ are amplified by a selected one of pairs of amplifier circuits 172 and 174; 175 and 176; 177 and 178; and 179 and 190 only when a selected one of the printing signal C1, C2, C3 and C4 is turned on. In this case, the driving pulse generating circuit 160 acts as a clock generating circuit for continuously generating the pulses $P_b$ and $P_d$ at a predetermined period regardless of the existence of the printing signals C1 to C4.

Figure 18:
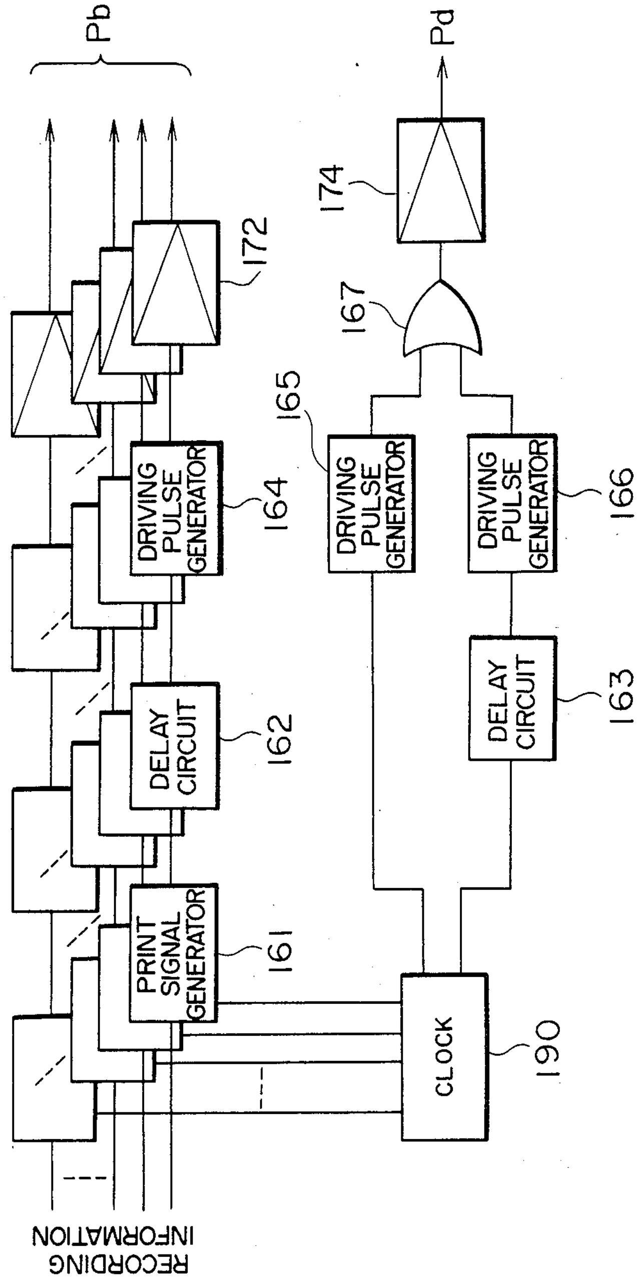
FIG. 18 is a block diagram showing a second embodiment of the driving voltage generating circuit which can be applied to the fourth embodiment of the same.

FIG. 18 shows another embodiment of the driving signal generating circuit which can be applied to the multi-nozzle head unit of FIG. 12.

In this embodiment, the common PZT **42*h* of FIG. 12 is connected to an output of an amplifier 174 of FIG. 18, so that the driving pulse signals $P_{d1}$ and $p_{d2}$ are generated from the amplifier 174 in accordance with clock pulses from a clock pulse generator 190. Further, the PZTs 42*a* to 42*g* of FIG. 12 are connected to the respective outputs of amplifiers 172** so that the driving pulse signal $P_b$ is applied to a selected one of the PZTs in accordance with a printing signal and the clock pulse so as to expel an ink droplet through a selected one of the nozzles designated by the printing signal.

Figure 19:
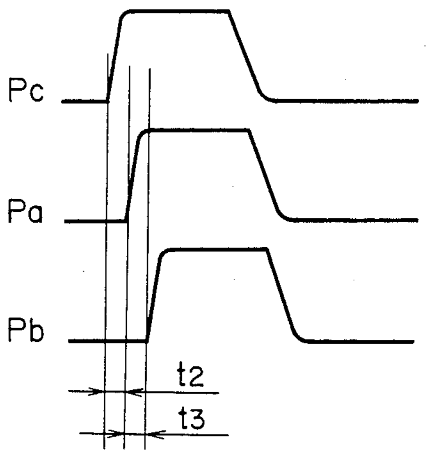
FIG. 19 is a waveform diagram of the driving voltages which can be applied to the ink droplet expelling apparatus according to the present invention.
Figure 20:
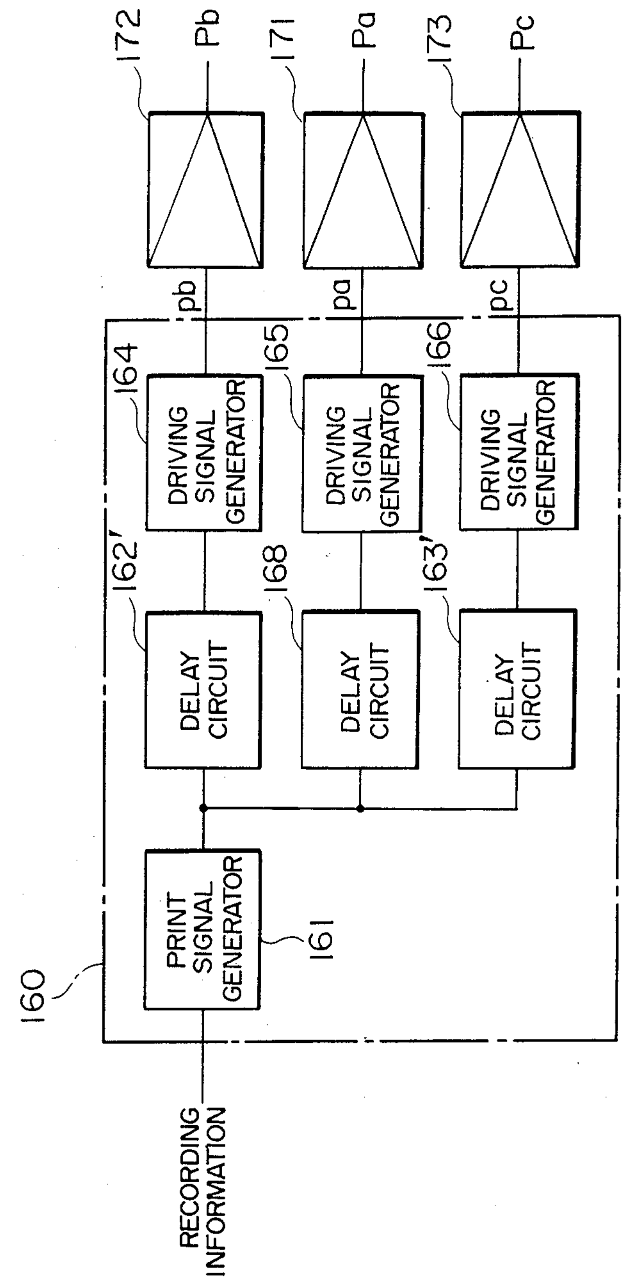
FIG. 20 is a block diagram showing an embodiment of the driving voltage generating circuit for generating the driving voltages of FIG. 19.

According to the present invention, the pressure control can be considerably freely performed in accordance with electric pulses, so that it is possible to have a function for generating a large pressure not only for expelling an ink droplet for printing but also for removing a ink deposit. For example, in the head of the first embodiment of FIG. 5, if the three PZTs are driven substantially at the same time, a considerably large pressure ca be generated in the vicinity of the nozzle and a deposit in the nozzle can be removed by the pressure. That is, if the driving pulse signals $P_a$, $P_b$ and $P_c$ as shown in FIG. 19 are generated so as to drive the PZTs *27c*, *27a* and *27b*, it is possible to remove the deposit of ink by the generated large pressure. FIG. 20 shows an embodiment of the driving signal generating circuit having a function for producing driving pulse signals for generating a pressure fōr the purpose of removing an ink deposit. The circuit of FIG. 20 is different from the circuit of FIG. 14A in that there is provided a delay circuit 168 in the preceding stage of the pulse generating circuit 165 such that the delay time of each of the delay circuits 162′, 163′ and 168 is variable. That is, during a normal printing period, the respective delay times of the delay circuits 168, 162′ and 163′ are set to be zero, $t_0$ and $t_1$ to produce the driving pulses $P_a$, $P_b$ and $P_c$ as shown in FIG. 14B so as to generate pressures by the PZTs *27a*, *27b* and *27c* in the order of the signal mentioned above, while in the case where it is intended to remove an ink deposit during a non-printing period, the respective delay times of the delay circuits 163′, 168 and 162′ are selected to be zero, $t_2$ and $t_2+t_3$, to produce the driving pulse signals $P_c$, $P_a$ and $P_b$ as shown in FIG. 19 so as to generate pressures by the PZTs *27c*, *27a*, *27b* in this order. Thus, according to the driving signal generating circuit as shown in FIG. 20, it is possible to desirably provide a difference in timing of generation of the driving pulse signals between the cases of printing and non-printing, so that a large pressure for removing an ink deposit can be produced when there occurs an ink deposit.

Although the pressure generating means is realized by an electro-mechanical transducer element, that is a PZT, and an electric pulse in the embodiments as described above, it is possible to employ, as a pressure generating device, another system, such as, for example, a so-called bubble jet system in which air bubbles are generated by thermal energy. Further, it is a matter of course that the shape of the ink chamber, etc., not limited to those illustrated in the foregoing embodiments.

According to the present invention, since it is possible to increase the ink expelling speed out of the nozzle without increasing the value of the negative pressure generated in the ink chamber, an ink droplet can be expelled at a high speed stably to thereby make it possible to realize a more accurate and reliable printing apparatus. For example, in the ink droplet expelling apparatus according to the present invention it is possible to raise the expelling speed of an ink droplet up to about 4 m/sec, while in the conventional one the speed was about 3 m/sec.

Further, according to the present invention, the pressure fluctuation in ink fluid can be controlled by the generation of three pressures so that the expelling frequency of ink droplets can be made high. For example, in the printing apparatus in which the ink droplet expelling apparatus according to the present invention is employed, it is possible to perform printing at a speed of about 1.5 times as high as that in the conventional one.

Moreover, even when it is required to alter the shape and/or size of flow path for the actual situation, it is possible to electrically compensate for the change in ink droplet expelling characteristic due to the alteration.

We claim:

1. An apparatus for expelling ink droplets in accordance with electric signals comprising:

a printing head having at least one ink chamber and at least one nozzle for expelling ink;

ink supply means communicated with said ink chamber for supplying said ink chamber with ink;

electric signal generating means for generating a first, a second, and a third signal, and pressure generating means including a first, a second, and a third pressure generator arranged along the ink expelling direction for varying said ink chamber in volume, said first pressure generator being arranged to make high a pressure in said ink chamber in response to said first signal, said second pressure generator being disposed closer to said nozzle than said first pressure generator and arranged to make high the pressure in said ink chamber in response to said second signal so as to cause said chamber to expel an ink droplet out of said nozzle, said third pressure generator being disposed at a position not closer to said nozzle than said first pressure generator and arranged to make high the pressure in said ink chamber in response to said third signal so as to suppress pressure fluctuation in said ink chamber caused by said first and second pressure generators, said first signal being applied first to said first pressure generator, said second signal being applied to said second pressure generator with a predetermined time delay from said first signal, said third signal being applied to said third pressure generator with a predetermined time delay from said second signal.

2. An ink droplet expelling apparatus according to claim 1, wherein said ink chamber includes three ink chamber portions disposed serially in the ink expelling direction and communicated with each other through two orifices, said third, first, and second pressure generators being disposed on said head respectively corresponding to said three ink chamber portions, in the order mentioned above toward said nozzle.

3. An ink droplet expelling apparatus according to claim 2, wherein said electric signal generating means includes a print signal generating circuit for generating an ink droplet expelling command signal in response to externally applied recording information, a first driving signal generating circuit for generating said first signal in response to said command signal, a second driving signal generating circuit for generating said second signal with a predetermined time delay $t_0$ from generation of said command signal, and a third driving signal generating circuit for generating said third signal with a predetermined time delay $t_1$ ($t_1>t_0$) from generation of said command signal.

4. An ink droplet expelling apparatus according to claim 3, wherein said first, second and third driving signal generating circuits including amplifier circuits for individually adjusting rising and falling timings of said first, second and third signals respectively and correspondingly.

5. An ink droplet expelling apparatus according to claim 1, wherein said ink chamber is a single ink chamber, said third, first and second pressure generators being disposed on said head in the order mentioned above toward said nozzle.

6. An ink droplet expelling apparatus according to claim 5, wherein said electric signal generating means includes a print signal generating circuit for generating an ink droplet expelling command signal in response to externally applied recording information, a first driving signal generating circuit for generating said first signal in response to said command signal, a second driving signal generating circuit for generating said second signal with a predetermined time delay $t_0$ from generation of said command signal, and a third driving signal generating circuit for generating said third signal with a predetermined time delay $t_1$ ($t_1>t_0$) from generation of said command signal.

7. An ink expelling apparatus according to claim 6, wherein said first, second and third driving signal generating circuits including amplifier circuits for individually adjusting rising and falling timings of said first, second and third signals respectively and correspondingly.

8. An apparatus for expelling ink droplets in accordance with electric signals comprising:

a printing head having two ink chambers and at least one nozzle for expelling ink, said chambers being disposed serially in the ink expelling direction and communicated with each other through an orifice;

ink supply means communicated with at least one of said ink chambers for supplying said at least one of said ink chambers with ink, electric signal generating means for generating a first, a second and a third signal; and pressure generating means including a first and a second pressure generator arranged serially in the ink expelling direction for varying said ink chambers in volume, said first pressure generator being arranged to make high pressure in one of said ink chambers in response to said first signal and also to make another high pressure in said one ink chamber in response to said third signal to suppress pressure fluctuation in said one chamber caused by said first and second pressure generators, said second pressure generator being disposed closer to said nozzle than said first pressure generator and arranged to make high the pressure in another of said ink chambers in response to said second signal so as to cause said another chamber to expel an ink droplet out of said nozzle, said first signal being applied first to said first pressure generator, said second signal being applied to said second pressure generator with a predetermined time delay from said first signal, said third signal being applied to said first pressure generator with a predetermined time delay from said second signal.

9. An ink droplet expelling apparatus according to claim 8, wherein said electric signal generating means includes a print signal generating circuit for generating an ink droplet expelling command signal in response to externally applied recording information, a first driving signal generating circuit for generating said first signal in response to said command signal and generating said third signal with a predetermined time delay $t_1$ from generation of said command signal, and a second driving signal generating circuit for generating said second signal with a predetermined time delay $t_o$ ($t_1>t_o$) from generation of said command signal.

10. An ink droplet expelling apparatus according to claim 8, wherein a land for suppressing generation of air bubbles is formed in each of said two ink chambers.

11. An apparatus for expelling ink droplets in accordance with electric signals comprising:

a printing head having a plurality of ink expelling nozzles, a common ink chamber and a plurality of ink chambers correspondingly respectively communicated with said ink expelling nozzles;

ink supply means communicated with at least said common ink chamber for supplying at least said common ink chamber with ink;

electric signal generating means for generating a first, a second, and a third signal; and pressure generating means including a plurality of individual pressure generators provided on said head respectively corresponding to said ink chambers, each of said ink chambers being communicated with said common ink chamber through an orifice and a common pressure generator provided on said head corresponding to said common ink chamber;

said common pressure generator being arranged to make high pressure in said common ink chamber in response to said first signal and also to make another high pressure in said common ink chamber in response to said third signal to suppress pressure fluctuation in said ink chamber caused by said common an individual pressure generators, and each of said individual pressure generators being disposed closer to said nozzles than said common pressure generator and arranged to make high the pressure ins aid associated ink chambers in response to said second signal so as to cause said chambers to expel an ink droplet out of said nozzles, said first signal being applied first to said common pressure generator, said second signal being applied to a designated one of said individual pressure generators with a predetermined time delay from said first signal, and said third signal being applied to said common pressure generator with a predetermined time delay from said second signal.

12. An ink droplet expelling apparatus according to claim 11, wherein said electric signal generating means includes a print signal generating circuit for generating an ink droplet expelling command signal in response to externally applied recording information, a first driving signal generating circuit for generating said first signal in response to said command signal and generating said third signal with a predetermined time delay $t_1$ from generation of said command signal, a second driving signal generating circuit for generating said second signal with a predetermined time delay $t_0$ ($t_1 > t_0$) from generation of said command signal, and a gate circuit for applying said second signal only to a selected one of said individual pressure generators corresponding to a selected one of said nozzles externally instructed to expel an ink droplet.

* * * * *